Dec. 29, 1931.  J. P. LAWRENCE  1,838,772
CONVEYER
Filed March 23, 1927   2 Sheets-Sheet 1
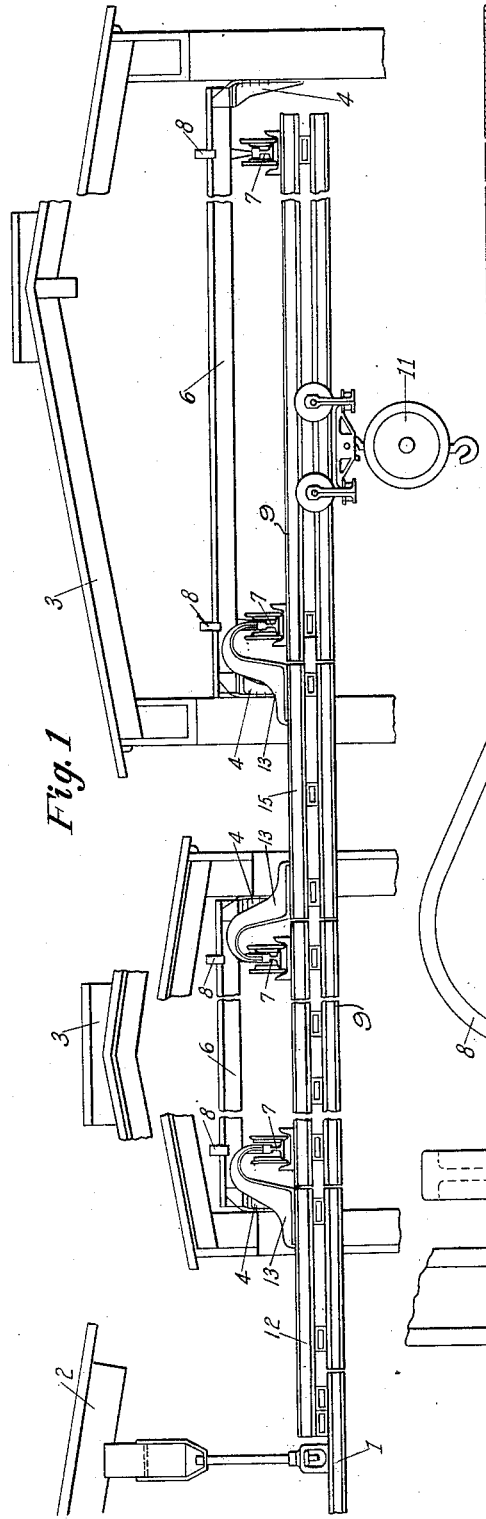
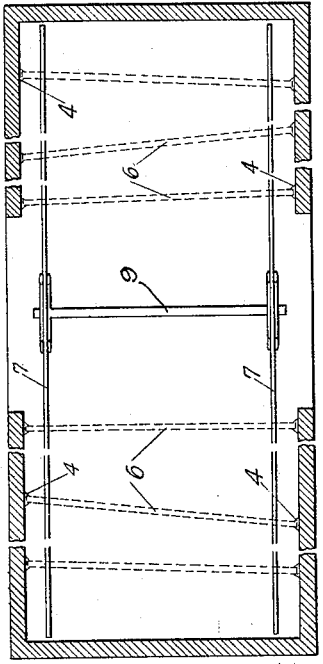
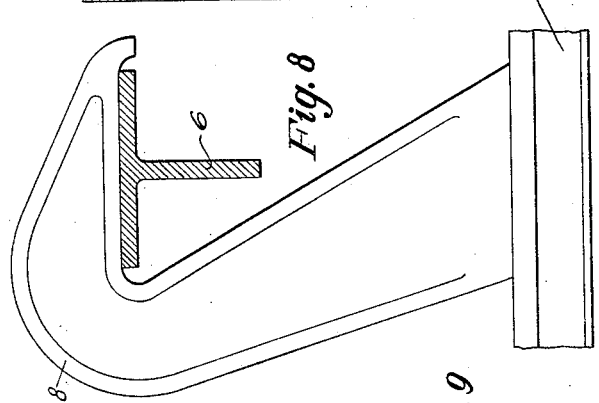
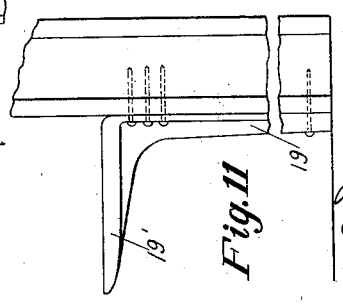
INVENTOR
James Paul Lawrence
BY
Richey & Watts
ATTORNEYS Dec. 29, 1931.  J. P. LAWRENCE  1,838,772
CONVEYER
Filed March 23, 1927  2 Sheets-Sheet 2
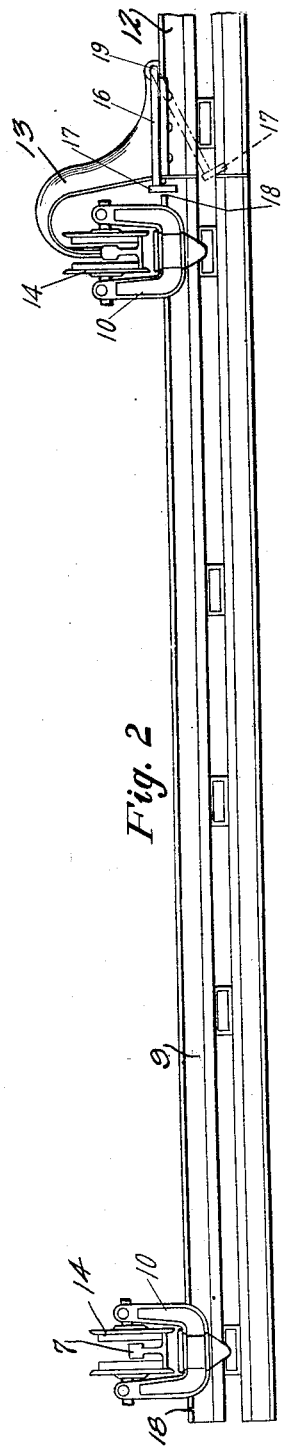
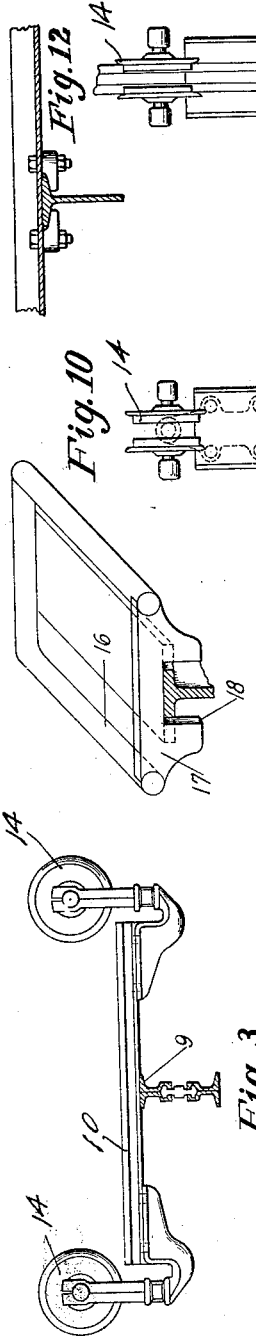
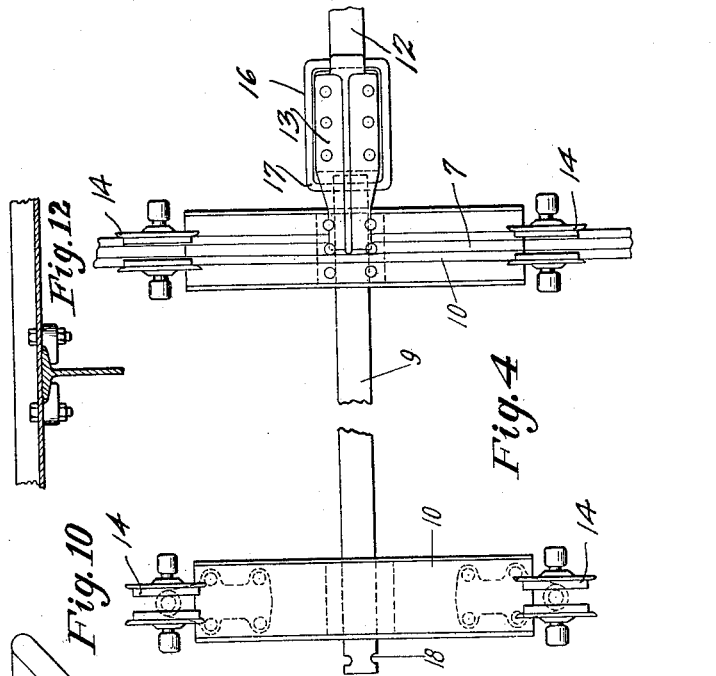
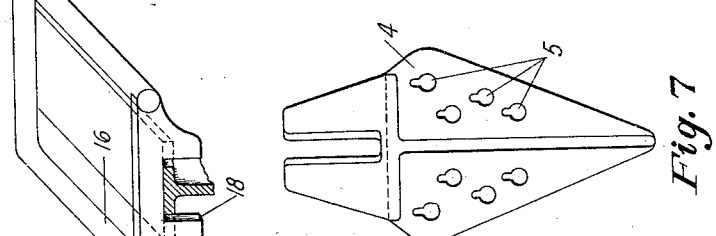
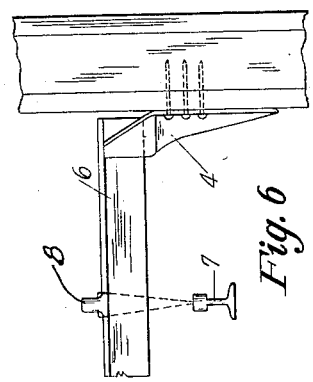
INVENTOR
James Paul Lawrence
BY
Richey & Watts
ATTORNEYS Patented Dec. 29, 1931

1,838,772

UNITED STATES PATENT OFFICE

JAMES PAUL LAWRENCE, OF CLEVELAND, OHIO, ASSIGNOR TO AMERICAN MONORAIL COMPANY, OF CLEVELAND, OHIO, A CORPORATION OF OHIO

CONVEYER

Application filed March 23, 1927. Serial No. 177,531.

This invention relates to suspended track conveyers and particularly to such conveyer for use in loading or unloading a box car or the like. It also relates to a new and improved method of loading or unloading box cars or the like with heavy bulky articles.

Heretofore, some difficulty has been experienced in loading or unloading heavy articles into or from box cars and the like. The articles are usually handled by trucks but this not only requires much labor, but also may require crating which is an added expense. For example, in loading automobile engines into a box car the engines are first crated and placed on skids, then they are taken into the car on trucks, and after being unloaded are, if necessary, slid into the desired place in the car. Much labor and material is thus consumed in loading and a corresponding amount of labor is consumed in unloading. Some of the material of the crates and skids can be salvaged but the return freight charges on it is an important cost item.

By my invention I am able to dispense with all but a small part of the labor previously required; to expedite the loading or unloading; and to avoid damage to the article and the use of crates, skids, and the like which are incident to the prior art methods of loading or unloading.

My improved apparatus may be described briefly as comprising a suspended track on which a trolley with its load may run into or out from a box car or the like, and a system of suspended track within the car easily connectible with the outside track and upon which the loaded trolley may be carried to or from a position vertically above the resting place of the load in the car or substantially so. In its preferred form my apparatus includes two tracks removably suspended in the car and a transfer crane which may be of knock down construction to run thereon.

My improved method may be briefly described as moving a suspending load into a box car or the like and then to a position above or substantially above the desired resting place for the load in the car and in lowering the load substantially vertically to its resting place. The method contemplates the lowering of any load in practically any part of the car and avoids any considerable amount of labor in the lowering or lifting placing operation. The unloading operation is the reverse of the loading operation.

In the drawings accompanying and forming a part of this application and in which I have illustrated one form of apparatus embodying my invention.

Fig. 1 is a fragmentary vertical elevation showing apparatus embodying my invention, assembled in position for loading or unloading one or more box cars or the like, and Figs. 2 and 3 are respectively enlarged side and end elevations of the transfer crane and certain associated parts shown in Fig. 1.

Fig. 4 is a top plan view with parts broken away of the transfer crane of Figs. 2 and 3.

Fig. 5 shows diagrammatically the arrangement and relation of parts within a car, or the like, of Fig. 1.

Figs. 6 and 7 are enlarged elevational views of the removable supporting bracket and cross bar employed within the car to support the tracks and transfer crane of Fig. 1.

Figs. 8 and 9 are respectively enlarged side and front elevational views of the sliding crane rail hanger and associated rail.

Fig. 10 is a perspective view of a latch which in one position is capable of preventing relative movement of the transfer crane and the removable track section, and in another position is capable of acting as a stop for a trolley when the transfer crane is out of alignment with the removable track section, and, Fig. 11 shows a modified form of crane rail supporting member.

Figure 12 is a detailed showing of the connection between the crane trucks and the crane beam.

Referring now to the figures in which I have illustrated apparatus embodying my invention for loading articles into or unloading articles from a box car, a fixed track or rail 1 is shown suspended from any suitable structure, for example, the roof of a building or shed 2. 3 indicates generally the upper portion of a box car or the like to the opposite side walls of which car are removably secured brackets 4. Nails or other suitable securing means may be used to fasten the brackets 4 to the car and if preferred the brackets 4 may be provided with key-hole shaped nail holes as indicated at 5, to facilitate the quick removal of the brackets from or assembly with, the car. The brackets 4 are attached to the car in pairs, more or less opposite each other, the exact positioning of the opposed bracket of any pair being determined by the width of the car and the length of the cross bars 6 which are carried at either end in the brackets of any pair. In Fig. 5 is shown an arrangement of brackets and cross-bars where the bars are not all of the same length. As will be understood, this illustrates the arrangement of brackets with cars of different widths and cross bars 6 of substantially the same length.

From the cross bars 6 one or more rails or craneways 7, in this instance, two, are suspended as by sliding rail hangers 8 which are capable of being slid lengthwise of the rail 7 and which hook over the cross bars 6. The rails 7 and hangers 8 may thus be slid lengthwise of the cross bars 6 and rails also may be slid lengthwise of the car, that is, at right angles to the cross bars 6. The rail 7, in being adjusted lengthwise of the car, moves with respect to the sliding rail hanger 8.

Means are provided within the car for carrying a load lengthwise of the car and along the rails 7 which constitute a track or tracks for the load carrier. The means illustrated comprises a transfer crane having a beam 9 and a pair of crane trucks 10 adjustably and removably mounted on the beam and disposed to run upon each of the rails 7. This beam is provided with a track or rail portion corresponding to the portion of the track or rail 1 on which a trolley 11 may run. In order to span the space between the end of the fixed track 1 and the track portion of the crane beam 9 I have provided a removable track or rail section 12 equipped with a track or rail suitable for the trolley 11 and have supported said section 12 at one end on the fixed track 1 and at the other end on one of the rails 7 as by means of a bracket 13 which is so shaped as to arch over the rollers 14 of the crane trucks 10 and to seat securely on the rail 7. The means of supporting the section 12 in position between the fixed track 1 and to the crane are such as to accommodate tilting or tipping of a box car or the like before, during and after loading and unloading while at the same time affording a positive connecting link between the rail 1 and the transfer crane over which loads may be carried, as on trolley 11, to or from the crane.

In case it is desirable to load or unload through one car into another car beyond the first, a removable track section 15 may be used to span the space between the rails 7 of the adjacent cars. This section 15 resembles section 12 in substantially all respects except that a bracket 13 is provided at either end thereof.

As a means of preventing trolleys running off the end of sections 12 or 15 when the crane is not in a position to receive a trolley therefrom and also as a means of insuring alignment and relative positioning of the crane beam with such a section, I have provided a latch 16 which may be described as a U-shaped member having a notched cross bar 17 at the end of the U which, when the crane beam 9 is in alignment with the section will fit into corresponding slots 18 in the beam 9, and when the beam is out of alignment with the section will drop down against the end of the section so that the bar 17 will assume substantially the dotted line position of Fig. 2 where it will engage with and effectively stop the wheels of trolley 11 or the like. The U-shaped member 16 is conveniently held in place for such pivotal or swinging movement by a suitably shaped opening 19 between bracket 13 and the top of the section 12.

In Fig. 11 I have shown an alternative form of apparatus which may be employed instead of the brackets 4 and cross bars 6. This comprises posts 19 which may extend down toward or even rest on the floor of the car or the like and be removably secured to the sides of the car. At the upper end each bracket has a projection 19' extending in a direction transversely of the car from which the crane rail may be removably suspended.

From the foregoing description it will be understood that the device illustrated may be installed in a box car, or the like quickly and with but little labor and may be removed even more quickly and easily. The brackets 4 are first attached to the sides of the car and cross bars assembled therewith. Then the rails 7 are suspended from the bars 6 by suitably adjusting the hangers 8. Then the crane trucks 10 are placed in position on the rails 7 either with the crane beam 9 previously assembled with the trucks, or with the beam assembled therewith after the trucks are in place on the rails 7. Then the track section 12 is placed in position and the device is ready for use. When a second car is to load or load into or through the first car, the parts 4, 6, 7, 8, 9 and 10 are assembled in each of the cars and the cranes of the two cars are operatively connected by means of the removable track section 15. In the operation of loading a car or the like the load carrying trolley 11 is conducted upon the fixed track 1 and across the removable track section 12 to the track portion of the crane. The crane is then moved longitudinally of the car upon the rails 7. The load can then be deposited on any portion of the floor of the car.

It will be understood that, due to the possibility with my apparatus of moving a load carried by trolley 11 to any desired position in a car or the like, a suspended load may be moved into the car and above any desired resting place substantially vertically, that is, without swinging the load more than a foot or so out of a truly vertical line as it is lowered. In unloading, the load is lifted substantially vertically. This greatly expedites loading, placing and unloading and obviates the great amount of labor heretofore required to place an article in any particular location in the car.

The rollers of the trolley constitute an antifriction means whereby a suspended load may be transferred to the box car.

Although I have described, in some detail, apparatus embodying one form of my invention it will be understood that various changes may be made in the apparatus shown without departing from the spirit of my invention, the scope of which is defined in what is claimed.

1. Suspended apparatus for loading and unloading box cars and the like comprising in combination a fixed track, a craneway suspended within a box car or the like, a crane having wheels to run on the movable craneway and including a track for a trolley, a removable track section spanning the space between said tracks, and a load carrying trolley adapted to run on the said tracks.

2. Suspended apparatus for loading and unloading box cars and the like comprising in combination a fixed track, a movable craneway suspended within a box car or the like, a crane having wheels to run on the movable craneway and including a track for a trolley, a removable track section spanning the space between said tracks, a latch carried by the removable track section and engageable with the said crane to insure relative positioning of the said section and crane, and a load carrying trolley adapted to run on the said tracks.

3. Suspended apparatus for loading or unloading box cars or the like comprising in combination, a fixed track for a trolley, a craneway within a box car or the like including a pair of rails supported from above, and each rail having oppositely extending flanges for twin trolley wheels, a crane mounted to run on the said pair of rails, a removable track section spanning the space between the fixed track and the crane, and a load carrying trolley adapted to run on the said fixed track and track section.

4. Suspended apparatus for loading or unloading box cars or the like comprising in combination, a fixed track for a trolley, a movable craneway within a box car or the like including a pair of rails, a transfer crane having wheels to run on the said craneway and having a track section for a trolley, and a load-carrying trolley adapted to run on the said fixed track and track section of the crane.

5. Suspended apparatus for loading or unloading box cars or the like comprising in combination, a craneway including parallel rails within and extending lengthwise of the box car or the like, said rails being removably mounted in the car, each rail having oppositely extending treads for twin trolley wheels, a transfer crane mounted to run lengthwise of the car and having twin trolley wheels to run on each of the parallel rails and having a trolley track extending transversely of the car.

6. Suspended apparatus for loading and unloading a box car or the like comprising in combination a fixed trolley track outside of a box car or the like, a transfer crane within the car having twin trolley wheels mounted to run on oppositely extending tread portions of crane carrying rails, the crane having a trolley track, and means for operatively connecting the fixed track and the trolley track of the crane for permitting a trolley to run from one track to the other.

7. The combination with a box car or the like of suspended crane carrying rails disposed along the opposite inner sides of the car, and a transfer trolley carrying crane removably suspended from the rails.

8. The combination with a box car or the like of a pair of relatively adjustable crane-carrying rails removably suspended within the car or the like, and a removable transfer crane having trucks adjustably disposed to run on the said rails.

9. The combination with a box car or the like of a plurality of brackets arranged in pairs and removably secured to the upright sides of the car or the like and a suspended crane track removably and adjustably supported by the brackets.

10. The combination with a crane rail for use in a box car or the like, of rail-suspending hangers adjustably secured to the rail and adapted to support the rail adjustably from suitable supporting members.

11. The combination in a suspended transfer crane for use in a box car or the like, of a crane beam, and crane trucks adjustable lengthwise of the said beam to run on suitable supporting rails.

12. The combination with a box car or the like of a pair of relatively adjustable, crane-carrying rails removably suspended within the car or the like, crane trucks mounted to run on the said rails in their various adjusted positions, and a transfer crane beam adjustably carried by the said trucks.

13. The combination with a box car or the like of a pair of crane-carrying rails suspended within the car for adjustable positioning transversely of the car or the like, a transfer crane beam, and crane trucks adjustable lengthwise of the said beam and mounted to run on the said rails in their various positions.

14. The combination with a box car or the like of a pair of crane carrying rails suspended within the car for adjustable positioning transversely of the car or the like, a transfer crane beam, and crane trucks adjustable lengthwise of the said beam and mounted to run on the said rails in their various positions, the said beam being provided with a track for a load carrying trolley to run lengthwise thereof.

15. In mechanism of the class described, the combination, with a box car, of side supporting members at the side of the box car, and tracks each having oppositely extending flanges for twin trolley wheels, said tracks being removably supported in suspended position by the side supporting members.

16. In mechanism of the class described, the combination, with a freight car, of a supporting member affixed to the side of the car and having a member projecting inwardly from the upper part of the supporting member, and a track having oppositely extending treads for twin wheel trolleys removably suspended from the inwardly projecting member.

17. In mechanism of the class described, the combination, with a box car, of supporting members fastened to the side of the box car, a transverse member extending between the supporting members and supported thereby, track hangers carried by said transverse extending member, and a pair of tracks carried by the track hangers, each track having treads for the oppositely disposed twin wheels of trolleys.

18. In mechanism of the class described, the combination, with a freight car, of tracks mounted in the car, each track having oppositely extending treads for twin wheel trolleys, a crane, and twin wheel trolley means supporting the crane on the treads of the same tracks, said trolley means being removable from the said tracks.

19. In mechanism of the class described, the combination, with a freight car, of tracks mounted in the car, a crane, trolley means supporting the crane from the tracks, and means for adjusting the crane relative to the trolley means whereby the latter are rendered adjustable to accommodate varying distances between the tracks.

20. A quickly attachable and detachable apparatus for loading and unloading engines in and from freight cars comprising a plurality of supporting elements, means removably securing said supporting elements at intervals along opposite sides of the interior of the freight car, beams extending transversely of and within the freight car supported by pairs of said supporting elements, spaced rails extending longitudinally of and within the freight car and detachably supported by said beams, a travelling track extending transversely of the freight car and provided with rollers running on said spaced rails to support the track and permit travelling thereof longitudinally within the freight car, and a travelling hoist supported by said travelling track and movable thereon transversely of the freight car.

21. A knockdown loading and unloading device for freight cars comprising a traveling rail extending transversely of and within the freight car, spaced rails extending longitudinally of the freight car, and providing a running support for said traveling rail, means detachably securing said spaced rails to the freight car, and a hoist running on said traveling rail.

22. A knockdown loading and unloading device for freight cars comprising a plurality of beams extending transversely of and within the freight car, traveling hoist mechanism movable to positon the hoist longitudinally and transversely of the freight car, and means supporting said traveling hoist mechanism by said beams.

23. A knockdown motor loading and unloading apparatus for freight cars comprising brackets spaced along opposite inside walls of the freight car, means providing quick attachment and removal of said brackets to and from said walls respectively, cross beams supported by said brackets, and a traveling hoist mechanism supported by said beams.

24. A knockdown motor loading and unloading device for freight cars comprising a plurality of cross beams positioned within the freight car, a traveling hoist mechanism, and means suspending said hoist mechanism from cross beams permitting ready removal of said mechanism from said beams.

25. A loading and unloading apparatus for freight cars comprising in combination a plurality of beams extending transversely of and within the freight car, spaced rails supported by said beams and extending longitudinally of the freight car, a traveling rail extending transversely of the freight car and running on said spaced rails, and a hoist running on said traveling rail.

26. A knockdown loading and unloading device for freight cars comprising a plurality of beams extending transversely of and within the freight car, means removably securing said beams in position near the top of the freight car, spaced rails supported by said beams and extending longitudinally of the freight car, a traveling rail extending transversely of the freight car and running on said spaced rails, and a hoist running on said traveling rail.

27. A knockdown loading and unloading device for freight cars comprising a plurality of beams extending transversely of and within the freight car, traveling hoist mechanism movable to position the hoist longitudinally and transversely of the freight car, and means suspending said traveling hoist mechanism from and below said beams.

28. A knockdown motor loading and unloading device for freight cars comprising a plurality of cross beams positioned within the freight car, a traveling hoist mechanism, and hooks carried by said mechanism and engaging said beams whereby said mechanism is removably supported by said beams.

In testimony whereof I hereunto affix my signature this 19th day of February, 1927.

JAMES PAUL LAWRENCE.